(12) United States Patent
Ma et al.

(10) Patent No.: US 9,929,889 B2
(45) Date of Patent: Mar. 27, 2018

(54) PILOT SYMBOL PATTERNS FOR TRANSMISSION VIA A PLURALITY OF ANTENNAS

(71) Applicant: Apple Inc., Cupertino, CA (US)

(72) Inventors: Jianglei Ma, Kanata (CA); Ming Jia, Ottawa (CA); Wen Tong, Ottawa (CA); Peiying Zhu, Kanata (CA); Hang Zhang, Nepean (CA); Hua Xu, Nepean (CA); Dongsheng Yu, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/642,956

(22) Filed: Jul. 6, 2017

(65) Prior Publication Data
US 2017/0331659 A1 Nov. 16, 2017

Related U.S. Application Data

(63) Continuation of application No. 15/226,101, filed on Aug. 2, 2016, now Pat. No. 9,705,720, which is a
(Continued)

(51) Int. Cl.
*H04L 27/26* (2006.01)
*H04B 7/06* (2006.01)
(Continued)

(52) U.S. Cl.
CPC ............ *H04L 27/2611* (2013.01); *H04B 7/06* (2013.01); *H04B 7/08* (2013.01); *H04L 5/0007* (2013.01);
(Continued)

(58) Field of Classification Search
CPC . H04L 27/2611; H04L 5/0023; H04L 5/0007; H04L 25/0204; H04L 25/0232;
(Continued)

(56) References Cited

U.S. PATENT DOCUMENTS 5,867,478 A * 2/1999 Baum ................. H04L 1/06
370/203
5,995,551 A 11/1999 Mccallister et al.
(Continued)

FOREIGN PATENT DOCUMENTS

CN 1448015 A 10/2003
EP 1198100 A2 4/2002
(Continued)

OTHER PUBLICATIONS

Notification of Reexamination, Chinese Application No. 201110120817.9, dated Jul. 31, 2015, 25 pages.
(Continued)

*Primary Examiner* — Kabir A Timory
(74) *Attorney, Agent, or Firm* — Meyertons, Hood, Kivlin, Kowert & Goetzel, P.C.

(57) ABSTRACT

A method and apparatus for improving channel estimation within an OFDM communication system. Channel estimation in OFDM is usually performed with the aid of pilot symbols. The pilot symbols are typically spaced in time and frequency. The set of frequencies and times at which pilot symbols are inserted is referred to as a pilot pattern. In some cases, the pilot pattern is a diagonal-shaped lattice, either regular or irregular. The method first interpolates in the direction of larger coherence (time or frequency). Using these measurements, the density of pilot symbols in the direction of faster change will be increased thereby improving channel estimation without increasing overhead. As such, the results of the first interpolating step can then be used to assist the interpolation in the dimension of smaller coherence (time or frequency).

20 Claims, 20 Drawing Sheets

Related U.S. Application Data continuation of application No. 15/046,934, filed on Feb. 18, 2016, now Pat. No. 9,432,232, which is a continuation of application No. 13/944,022, filed on Jul. 17, 2013, now Pat. No. 9,270,510, which is a continuation of application No. 13/665,982, filed on Nov. 1, 2012, now Pat. No. 8,842,756, which is a continuation of application No. 12/064,566, filed as application No. PCT/CA2006/001380 on Aug. 22, 2006, now Pat. No. 8,331,465.

(60) Provisional application No. 60/722,744, filed on Sep. 30, 2005, provisional application No. 60/710,527, filed on Aug. 23, 2005.

(51) Int. Cl.
    *H04B 7/08*     (2006.01)
    *H04L 5/00*     (2006.01)
    *H04L 25/02*     (2006.01)

(52) U.S. Cl.
    CPC ........ *H04L 5/0023* (2013.01); *H04L 25/0226* (2013.01); *H04L 25/0232* (2013.01); *H04L 27/2626* (2013.01); *H04L 27/2647* (2013.01)

(58) Field of Classification Search
    CPC ......... H04L 27/2675; H04B 7/06; H04B 7/08; H04B 7/0413; H04B 7/0452
    See application file for complete search history.

(56) References Cited

U.S. PATENT DOCUMENTS

| | | | |
|---|---|---|---|
| 6,141,393 | A | 10/2000 | Thomas et al. |
| 6,175,590 | B1 | 1/2001 | Stein |
| 6,188,717 | B1 | 2/2001 | Kaiser et al. |
| 7,313,086 | B2 | 12/2007 | Aizawa |
| 7,436,757 | B1 | 10/2008 | Wilson et al. |
| 7,773,699 | B2 | 8/2010 | Jia et al. |
| 2003/0227866 | A1* | 12/2003 | Yamaguchi ......... H04L 25/0236 370/208 |
| 2004/0178934 | A1 | 9/2004 | Balakrishnan et al. |
| 2004/0190636 | A1 | 9/2004 | Oprea |
| 2004/0190640 | A1 | 9/2004 | Dubuc et al. |
| 2005/0265490 | A1 | 12/2005 | Sestok, IV et al. |

FOREIGN PATENT DOCUMENTS

| | | |
|---|---|---|
| WO | 2004004269 A1 | 1/2004 |
| WO | 2005022811 A1 | 3/2005 |

OTHER PUBLICATIONS

Office Action from Chinese Application No. 201310048966.8, dated Apr. 27, 2015, English and Chinese versions, pp. 1-10.

Office Action for European Patent Application No. 06721726.5, dated Sep. 14, 2016, pp. 1-4.

\* cited by examiner

PILOT SYMBOL PATTERNS FOR TRANSMISSION VIA A PLURALITY OF ANTENNAS

PRIORITY CLAIM INFORMATION

This application is a continuation of U.S. patent application Ser. No. 15/226,101, filed on Aug. 2, 2016, titled "Pilot Symbol Patterns for Transmission via a Plurality of Antennas", by Jianglei Ma et al., which is a continuation of U.S. patent application Ser. No. 15/046,934, filed on Feb. 18, 2016, (issued as U.S. Pat. No. 9,432,232 on Aug. 30, 2016) titled "Pilot Symbol Patterns for Transmit Antennas", by Jianglei Ma et al., which is a continuation of U.S. patent application Ser. No. 13/944,022, filed on Jul. 17, 2013 (issued as U.S. Pat. No. 9,270,510 on Feb. 23, 2016), titled "Adaptive Two-Dimensional Channel Interpolation", by Jianglei Ma et al., which is a continuation of U.S. patent application Ser. No. 13/665,982, filed on Nov. 1, 2012 (issued as U.S. Pat. No. 8,842,756 on Sep. 23, 2014), titled "Adaptive Two-Dimensional Channel Interpolation", which is a continuation of U.S. patent application Ser. No. 12/064,566, filed on Sep. 4, 2008 (issued as U.S. Pat. No. 8,331,465 on Dec. 11, 2012), which is a U.S. National Stage of International Application No. PCT/CA2006/001380, filed on Aug. 22, 2006, which claims the benefit of priority to:

U.S. Provisional Application No. 60/722,744, filed on Sep. 30, 2005; and

U.S. Provisional Application No. 60/710,527, filed on Aug. 23, 2005.

All of the above identified Applications are incorporated by reference in their entireties as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications

BACKGROUND

Field of the Application

This invention relates to Orthogonal Frequency Division Multiplexing (OFDM) communication systems, and more particularly to channel interpolation with the use of pilot symbols.

Background of the Disclosure

In wireless communication systems that employ OFDM, a transmitter transmits data to a receiver using many sub-carriers in parallel. The frequencies of the sub-carriers are orthogonal.

Channel estimation in OFDM is usually performed with the aid of known pilot symbols which are sparsely inserted in a stream of data symbols. The attenuation of the pilot symbols is measured and the attenuations of the data symbols in between these pilot symbols are then estimated/interpolated.

Pilot symbols are overhead, and should be as few in number as possible in order to maximize the transmission rate of data symbols. It is desirable that channel estimation in OFDM be as accurate as possible without sacrificing bandwidth.

SUMMARY

In one embodiment, there is provided a method comprising receiving channel estimates for four pilot symbols in a scattered pilot pattern in time-frequency; calculating the channel response for the pilot symbols in both a first direction and a second direction; determining whether the channel changes more slowly in one direction than the other; and interpolating in the direction of slower channel change.

In some embodiments, the method of further comprises interpolating in the direction of faster channel change.

In some embodiments, the step of interpolating in the direction of faster channel change is performed using the result from the step of interpolating in the direction of slower channel change.

In some embodiments, the channel changes are calculated by performing an inner products operation.

In some embodiments, the first direction is a time direction and the second direction is a frequency direction.

In some embodiments, the first direction is a frequency direction and the second direction is a time direction.

In some embodiments, the scattered pilot pattern is a regular diamond lattice.

In some embodiments, the scattered pilot pattern is an irregular diamond lattice.

In some embodiments, the scattered pilot pattern is kite shaped.

In another embodiment, there is provided an OFDM receiver comprising: one or more receive antennas; the OFDM transmitter being adapted to receive channel estimates for four pilot symbols in a scattered pilot pattern in time-frequency, calculate channel changes for the pilot symbols in a first direction and a second direction, and interpolate in the direction of slower channel change.

In yet another embodiment, there is provided a method of interpolation using a set of four pilot symbols in a scattered pilot pattern in time-frequency wherein the set of four pilot symbols comprise first and second pilot symbols on a common sub-carrier frequency, spaced in time, and third and fourth pilot symbols transmitted on different sub-carriers on a common OFDM symbol period, the method comprising: determining a first channel change between the first and second pilot symbols; determining a second channel change between the third and fourth pilot symbols; determining which of the first and second channel change is slower; if the first channel change is slower, interpolating using the first and second pilot symbols to generate a channel estimate for the common sub-carrier frequency at the common OFDM symbol period, and then using the channel estimate in subsequent interpolations to determine other channel estimates; and if the second channel change is slower, interpolating using the third and fourth pilot symbols to generate a channel estimate for the common sub-carrier frequency at the common OFDM symbol period, and then using the channel estimate in subsequent interpolations to determine other channel estimates.

In yet another embodiment, a method of inserting pilot symbols into OFDM sub-frames for transmission by a plurality of transmitting antenna, the OFDM sub-frames having a time domain and a frequency domain, each OFDM sub-frame comprising a plurality of OFDM symbols, the method comprising: for each sub-frame, defining a set of at least two OFDM symbols none of which are consecutive that are to contain pilot symbols; at each antenna, inserting pilot symbols in each of the set of at least two OFDM symbols in a scattered pattern that does not interfere with the scattered pattern inserted by any other antenna.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION

Channel estimation in OFDM is usually performed with the aid of pilot symbols. More particularly, at an OFDM transmitter, known pilot symbols are periodically transmitted along with data symbols. The pilot symbols are typically spaced in time and frequency.

The variations in phase and amplitude resulting from propagation across an OFDM channel are referred to as the channel response. The channel response is usually frequency and time dependent. If an OFDM receiver can determine the channel response, the received signal can be corrected to compensate for the channel degradation. The determination of the channel response is called channel estimation. The transmission of known pilot symbols along with data symbols allows the receiver to carry out channel estimation.

When a receiver receives an OFDM signal, the receiver compares the received value of the pilot symbols with the known transmitted value of the pilot symbols to estimate the channel response.

Since the channel response can vary with time and with frequency, the pilot symbols are scattered amongst the data symbols to provide a range of channel responses over time and frequency. The set of frequencies and times at which pilot symbols are inserted is referred to as a pilot pattern. In some cases, the pilot pattern is a diagonal-shaped lattice, either regular or irregular.

Figure 1:
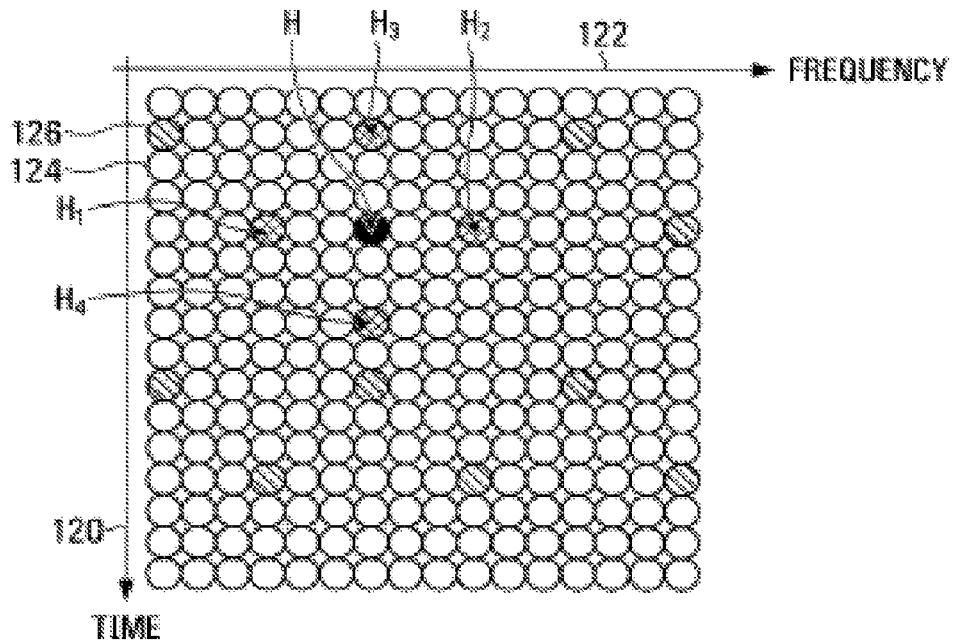
FIG. 1 is a diagram of a single antenna perfect diamond lattice scattered pilot pattern which can be used in accordance with an embodiment of the present invention.

FIG. 1 is an example pilot pattern which can be used in accordance with one embodiment of the present invention.

Pilot and data symbols are spread over an OFDM sub-frame in a time direction 120 and a frequency direction 122. Most symbols within the OFDM sub-frame are data symbols 124. Pilot symbols 126 are inserted in a diamond lattice pattern. In the illustrated example, the diamond lattice pattern in which each encoded pilot symbols are inserted within the OFDM sub-frame is a perfect diamond lattice pattern as illustrated by pilot symbols $h_1$, $h_2$, $h_3$ and $h_4$.

A two dimensional interpolator is used to estimate the channel response at point h which is between four points of known channel response, i.e. pilot symbols $h_1$, $h_2$, $h_3$ and $h_4$. Point h can then be used as an additional point from which the receiver can carry out channel estimation. The use of point h would, of course, not add any overhead to the OFDM signal.

The channel interpolation scheme is adaptive, i.e. it is a scheme which can adapt to varying conditions in the $$h(i,j)=w_1(i,j)h_1+w_2(i,j)h_3+w_4(i,j)h_4$$

channel. The following formula presents a particular example of adaptive two-dimensional (time direction and frequency direction) interpolator to calculate point h:

where $w_1(i,j)+w_2(i,j)+w_3(i,j)+w_4(i,j)=1$.

In this case, the two dimensional channel interpolation can be viewed as the sum of two one-dimensional interpolations.

The weights $w_k(i,j)$ may be adapted to coherence time and frequency of the channel. In some embodiments, if the channel coherence is less in the time direction than it is in the frequency direction, then h would be calculated using the following formula:

$$h(i,j)=w_1(i,j)h_1+w_2(i,j)h_2+w_3(i,j)h_3+w_4(i,j)h_4$$

where $w_3(i,j)=0$, $w_4(i,j)=0$, and $w_1(i,j)+w_2(i,j)=1$.

Alternatively, if the channel coherence is greater in the time direction than it is in the frequency direction, then h would be calculated using the following formula:

$$h(i,j)=w_1(i,j)h_1+w_2(i,j)h_2+w_3(i,j)h_3+w_4(i,j)h_4$$

where $w_1(i,j)=0$, $w_2(i,j)=0$, and $w_3(i,j)+w_4(i,j)=1$.

In another embodiment, the weights in both directions (time and frequency) are adaptively changed according to the channel coherence in the time and frequency directions as follows:

$$h(i,j)=c_{time}w_1(i,j)h_1+c_{time}w_2(i,j)h_2+c_{freq}w_3(i,j)h_3c_{freq}w_4(i,j)h_4$$

$c_{time}+c_{freq}=1$ $w_1(i,j)+w_2(i,j)+w_3(i,j)w_4(i,j)=1$

According to one embodiment, the sequence of interpolation is adapted to the coherence of the channel.

Figure 2:
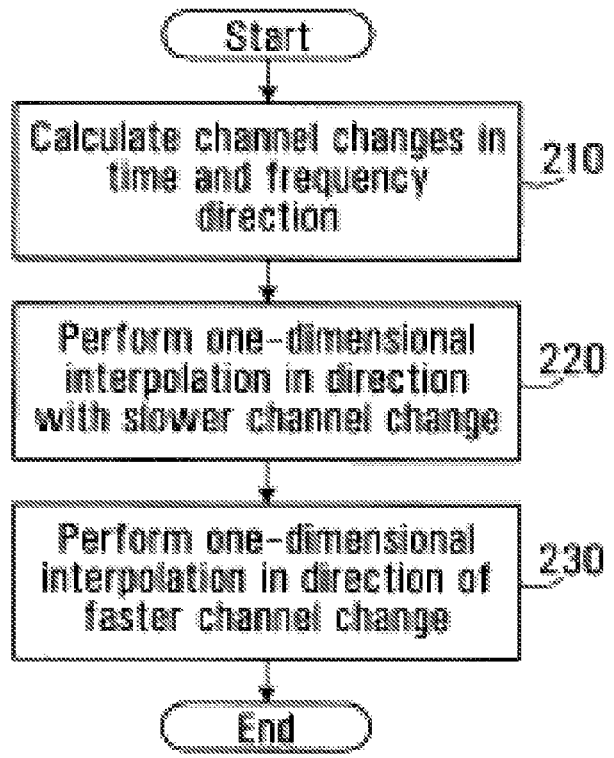
FIG. 2 is a flowchart of a method of performing adaptive interpolation in accordance with one embodiment of the present invention.

One way to achieve adaptive interpolation is to divide the interpolation into two one-dimensional steps as shown in the flowchart illustrated in FIG. 2:

i. at step 210, calculate the channel changes in both time and frequency directions and determine in which direction the channel changes faster;

ii. at step 220, perform one-dimensional interpolation in the direction with slower channel change to calculate h; and iii. at step 230, using h, perform one-dimensional interpolation in the direction with faster channel change.

The method of adaptive interpolation set out above takes advantage of the fact that interpolated results from the direction of larger coherence time/frequency is more reliable, and hence is interpolated first. The calculation of h will effectively increase the density of pilot symbols in the direction of faster change thereby improving channel estimation without increasing overhead. As such, the results of the first interpolating step can then be used to assist the interpolation in the dimension of smaller coherence time/frequency.

In general, there are at least three ways to evaluate the channel change between two pilots, including:

i. Euclidean distance. One problem with Euclidean distance, however, is that it is not sensitive to phase change;

ii. Phase change. One problem with phase change, however, is computation complexity; and iii. Amplitude change. One problem with amplitude change, however, is that it is insensitive to phase change.

In light of these drawbacks a way to measure channel change so as to take both amplitude change and phase change into account, while at the same time keeping the computation complexity to a minimum, is desirable. According to an embodiment of the invention, therefore, a way of using the inner products of the two pilot assisted channel estimates as a measurement of channel change is shown below.

$$\Lambda_{time}=\langle h_3, h_4 \rangle = |h_3||h_4|\cos(\theta_{3,4})$$

$$\Lambda_{freq}=\langle h_1, h_2 \rangle = |h_1||h_2|\cos(\theta_{1,2})$$

$\Lambda_{time}$ denotes channel change in the time direction.

$\Lambda_{freq}$ denotes channel change in the frequency direction.

The term "$\langle h_n \cdot h_m \rangle$" denotes the inner product of $h_n$ and $h_m$.

The term "$|h_n|$" denotes the magnitude of the vector $h_n$. If $h_n=a+bi$ then $|h_n|=sqr(a^2+b^2)$.

The term "$\cos(\theta 1,2)$" denotes the cosine of the difference in angle between $h_n$ and $h_m$: $\cos(\theta n,m)=\cos(\theta n-\theta m)$. If $h_n=a+bi$ then $\theta n$ can be calculated as $\theta n=\tan^{-1}(b/a)$.

The vector $h_n$ can be represented as $h_1=|h_1|e^{i\theta n}$, or as $h_n=a+bi$, where $a=|hn|\cos(\theta n)$, and $b=|hn|\sin(\theta n)$.

When the amplitude changes linearly between the two channel estimates, the maximum $\Lambda$ is achieved when $|1_1|=|h_2|$ in frequency and $|h_3|=|h_4|$ in time.

Hence the more the channel changes, the smaller the $\Lambda$, regardless whether this change is in amplitude or phase. The inner product is able to solve phase ambiguity. When $|\theta|>\pi/2$ (which rarely occurs), $\cos(\theta)$ becomes negative, and hence smaller. An inner product may then be computed, which requires two real multiplications and one real addition, and the result is therefore a real number.

Referring again to FIG. 1, what follows is an example of the adaptive interpolation method.

Assume:

$h_1=0.4423-1.0968i$ $h_2 = -0.0051 - 0.1484i$ $h_3 = 0.1258 - 0.3413i$ $h_4 = 0.3958 - 0.5883i$

The central point, known from a simulation, has the value of h=0.2859−0.4224i.

The inner product is then calculated as follows:

$\langle h_1 \cdot h_2 \rangle = 0.1605$ $\langle h_3 \cdot h_4 \rangle = 0.2506$ where $\langle h_1 \cdot h_2 \rangle$ =denotes the inner product of $h_1$ and $h_2$.

If $h_1 = a_1 + ib_1$ and $h_2 = a_2 + ib_2$ then the inner product can be calculated as $\langle h_1 \cdot h_2 \rangle = a_1 a_2 + b_1 b_2$.

Alternatively, $\langle h_1 \cdot h_2 \rangle = |h_1||h_2| \cos(\theta_2 - \theta_1)$.

Since $\langle h_1 \cdot h_2 \rangle < \langle h_3 \cdot h_4 \rangle$, the channel changes faster in the $h_1/h_2$ direction.

h is then estimated in both the frequency and time directions:

$\tilde{h}_{h1,h2} = 0.5(h_1 + h_2) = 0.2186 - 0.6226i$ $\tilde{h}_{h3,h4} = 0.5(h_3 + h_4) = 0.2608 - 0.4648i$ Compared with the known h, obviously $\tilde{h}_{h3,h4}$ provides a better estimate $\tilde{h}_{h1,h2}$; hence $\tilde{h}_{h3,h4}$ can be used to improve the channel interpolation quality in the $h_1/h_2$ direction.

Note that there is no requirement that h be the middle point equidistant from $h_1$, $h_2$, $h_3$ and $h_4$.

In the example above, the interpolation sequence was determined to be:

i. interpolate between the two pilots in the time direction first to calculate h, and ii. use h and/or one or both of the two pilots to interpolate in the frequency direction.

Of course, if the initial calculation used to determine which channel direction changes faster determines that the $h_3/h_4$ direction changes faster, then the interpolation sequence will be:

i. interpolate between the two pilots in the frequency direction first to calculate h, and ii. use h and/or one or both of the two pilots to interpolate in the time direction.

Once h is calculated, any one of a number of conventional channel estimation techniques can be used. Such channel estimation techniques typically consist of two steps. First, the attenuations at the pilot positions are measured. This measurement is calculated using the formula:

$$H(n,k) \equiv \frac{Y(n,k)}{X(n,k)}$$

where X(n,k) is the known pilot symbol, and Y(n,k) is the received pilot symbol.

These measurements are then used to estimate (interpolate) the attenuations of the data symbols in the second step. Persons skilled in the art will appreciate that such channel estimation techniques include, but are not limited to, linear interpolation, second order interpolation, maximum likelihood (least square in time domain), linear minimum square error and others.

In another embodiment, a "majority vote" is used to determine the interpolation sequence for all the "diamonds" across the frequency domain. This means that there are several calculations performed along the frequency direction for the channel change. Some results will indicate there is more change in time, while other results indicate there is more change in frequency. The "majority vote" option means the choice whether to interpolate first in the time direction or the frequency direction is arrived at by assessing the majority of the results. For example, if the majority of the results indicate that the channel changes faster in the time direction, then interpolation is first performed in the frequency direction, and then in the time direction. If the majority of the results indicate that the channel changes faster in the frequency direction, then interpolation is first performed in the time direction, and is then performed in the frequency direction.

Figure 3:
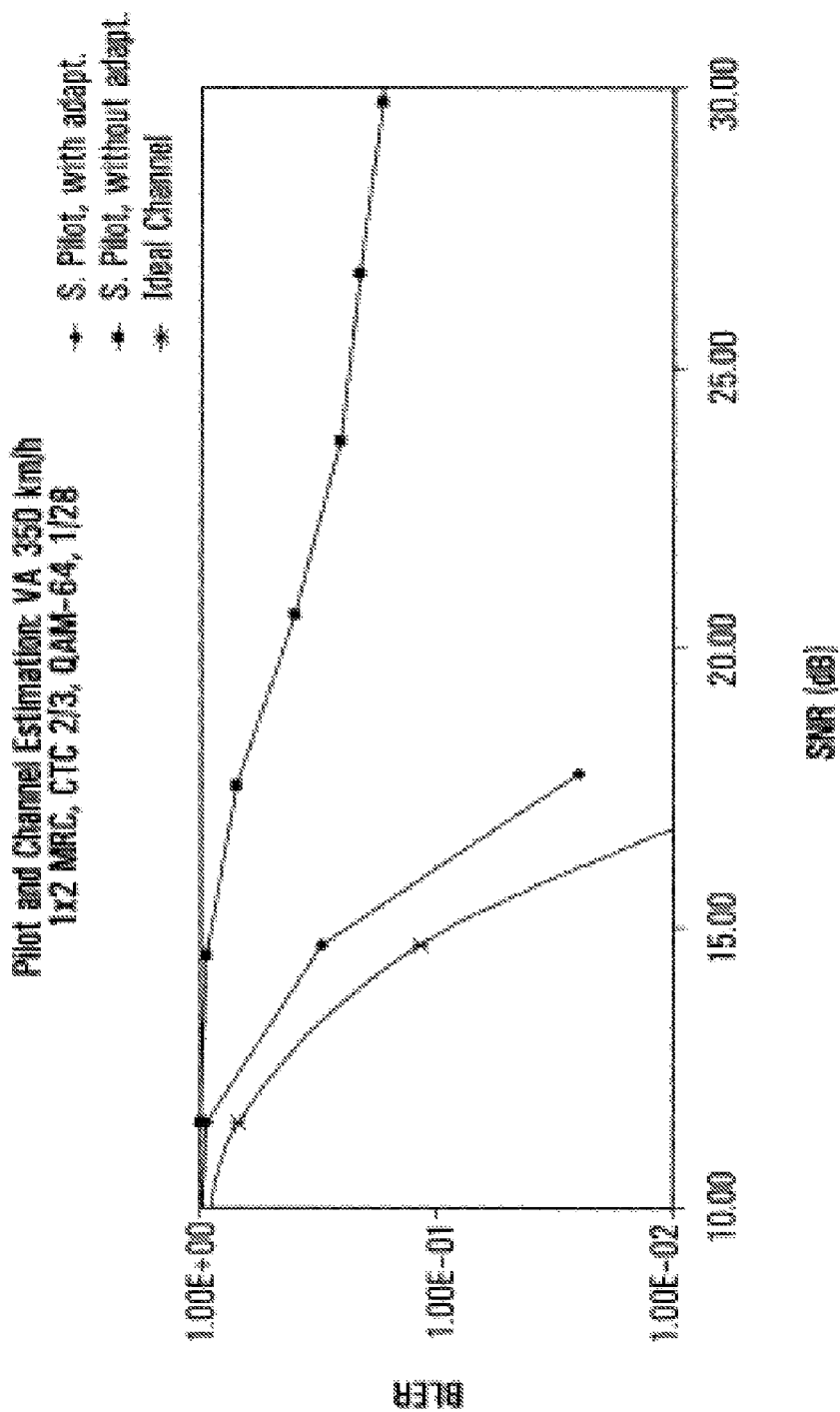
FIG. 3 presents simulation results for one example of adaptive interpolation.

In accordance with an embodiment of the invention, FIG. 3 presents simulation results for the adaptive interpolation method described above. The results show the benefit of adaptive interpolation when channel changes slower in the time direction when UE speed is low, and slower in the frequency direction when UE speed is high. The curve of "ideal channel" is of the case with clean known channel, i.e. with no interpolation loss and additive noise. As shown this approach recoups most of the interpolation loss. The results were obtained with the majority vote option described above.

It is not necessary that there be a regular diamond shaped pilot pattern in order to use the adaptive interpolation method described above. For example, an irregular diamond shaped pilot pattern can be used in accordance with other embodiments of the present invention, such as the scattered pilot patterns shown in FIGS. 4A to 11. In FIGS. 4A to 11, the number of OFDM symbols per Transmission Time Interval (TTI) is odd instead of even. In some embodiments, the scattered pilot patterns can be generated by more than one antenna such as is shown in FIGS. 5, 7, 9, 10, 11 and 12.

In general, the adaptive interpolation method works with all "staggered" pilot patterns which describes all shapes other than a square, which does not work. A perfect diamond shape, which is the most favorable shape, is a special case of a staggered pilot pattern. Another example of a pattern which would work is a "kite" pattern where the pilots are spread further apart in one direction than the other.

More generally, in FIGS. 4A to 11, in each sub-frame, pilots are transmitted by part of the sub-carriers in at least two non-contiguous OFDM symbols by at least one transmit antenna. The pilot sub-carriers in the first OFDM symbol and the second OFDM symbol are staggered in the frequency domain. In FIGS. 5A, 5D, 7A, 7D, 9A and 9D, pilot symbols from all transmit antennas are transmitted through the same non-contiguous OFDM symbols. This arrangement will save the terminal power since only two OFDM symbols are coded to obtain the channel information.

Figure 4A:
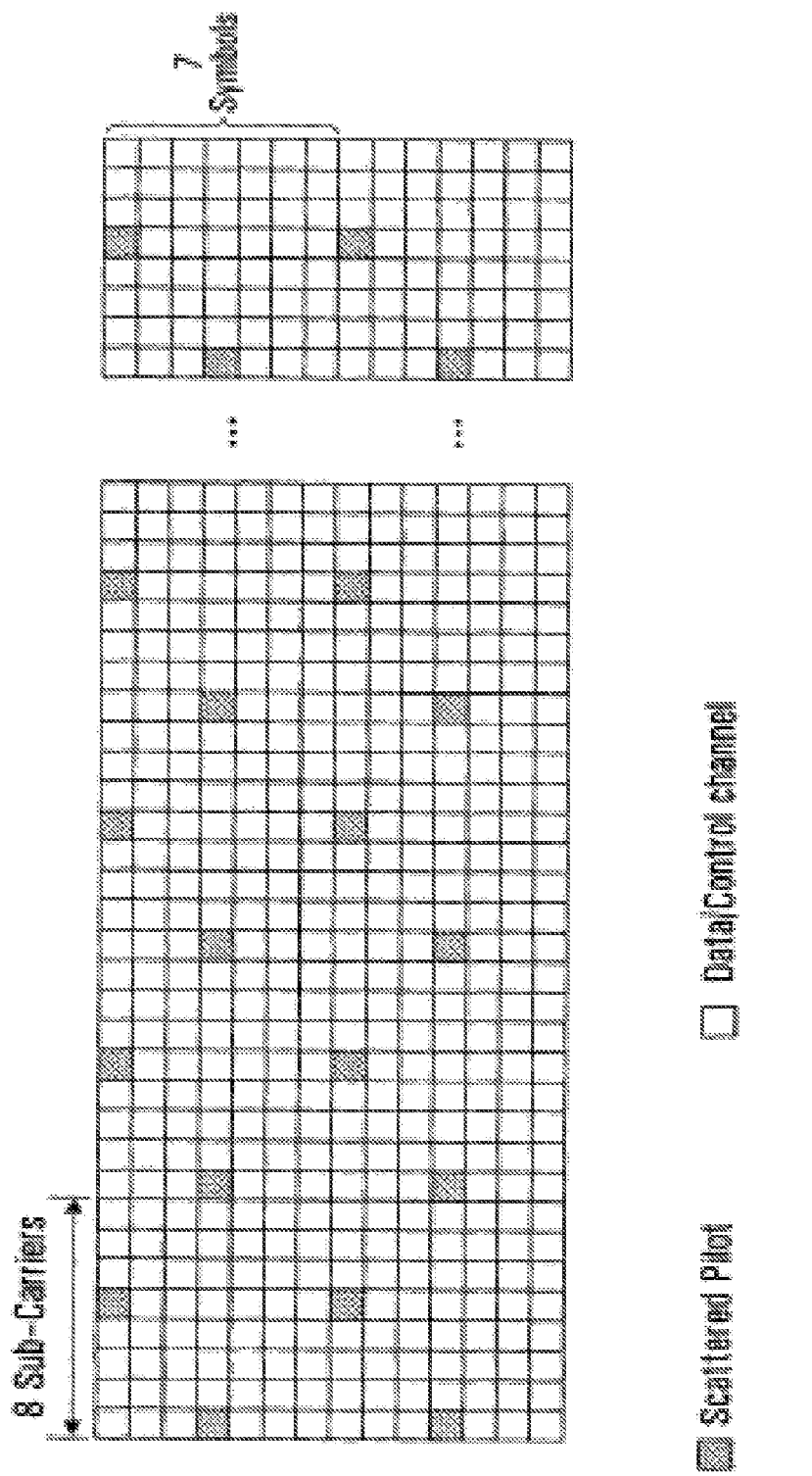
FIG. 4A is a diagram of a single antenna irregular diamond lattice scattered pilot pattern which can be used in accordance with an embodiment of the present invention.

FIG. 4A is a diagram of a single antenna irregular diamond lattice scattered pilot pattern which can used in accordance with an embodiment of the present invention. The overhead associated with this pilot pattern is 1/28 per antenna. Pilot and data symbols are spread over an OFDM sub-frame in a time direction 420 and a frequency direction 422. Most symbols within the OFDM sub-frame are data symbols 424. Pilot symbols 426 are inserted in an irregular diamond lattice pattern. In this embodiment, an OFDM sub-frame comprises eight sub-carriers 428 and seven OFDM symbols 430.

As with the scattered pilot pattern in FIG. 1, there is first performed a calculation of the channel changes in both the time direction and the frequency direction and a comparison is made as to which direction the channel changes faster.

One-dimensional interpolation is then performed in the direction with slower channel change. One-dimensional interpolation is then performed in the direction with faster channel change.

Figure 4B:
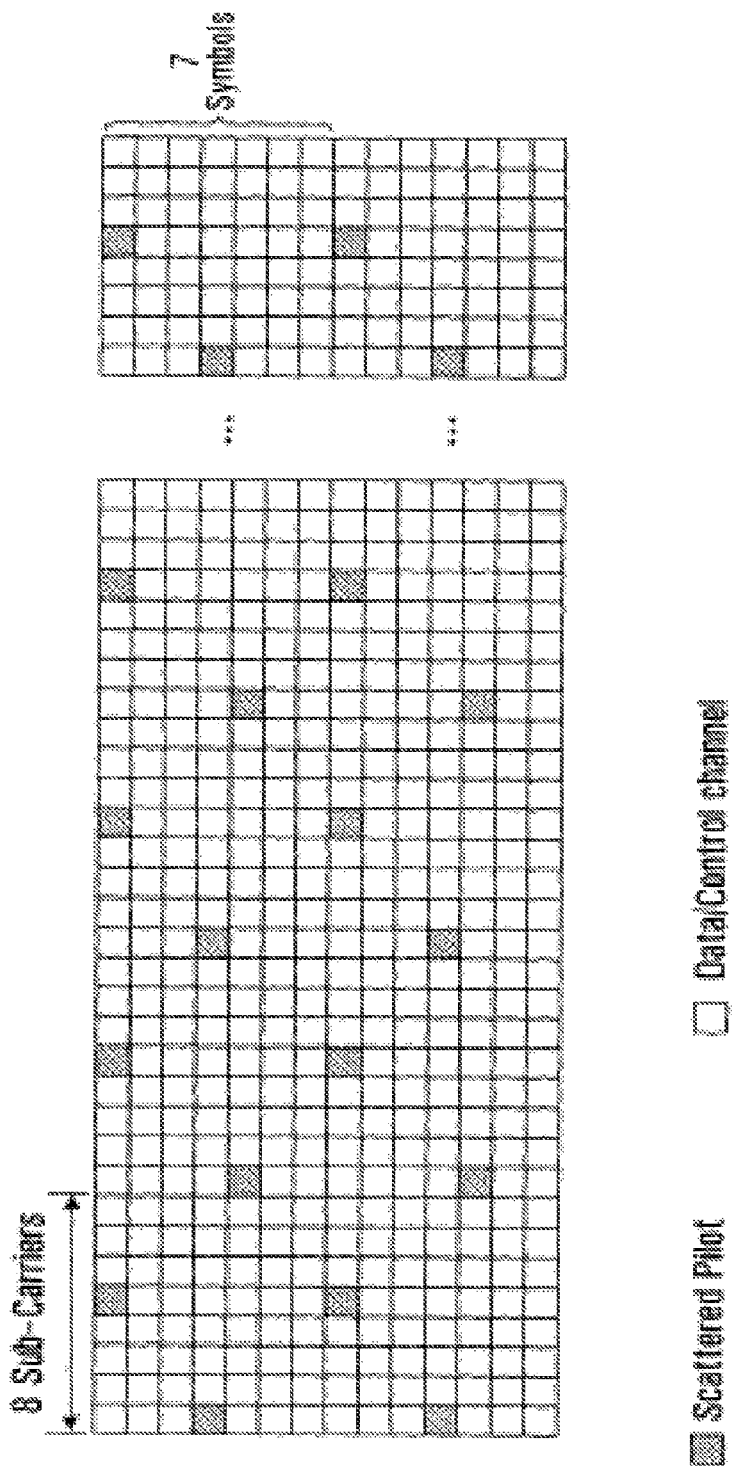
FIG. 4B is a diagram of a single antenna irregular diamond lattice scattered pilot pattern which can used in accordance with an embodiment of the present invention.

FIG. 4B is a diagram of a single antenna irregular diamond lattice scattered pilot pattern which can used in accordance with an embodiment of the present invention. Though similar to FIG. 4A, in this case one of the pilots in each diamond lattice is offset by one OFDM symbol position. Thus, the adaptive interpolation method does not require that the scattered pilots line up in either or both of the time direction and the frequency direction. In the case of staggered pilot patterns where the pilots do not line up in either the time direction, the frequency direction, or both, it is more accurate to refer to the "$h_1/h_2$ direction" and the "$h_3/h_4$ direction" rather than the time direction and the frequency direction.

Figure 5A:
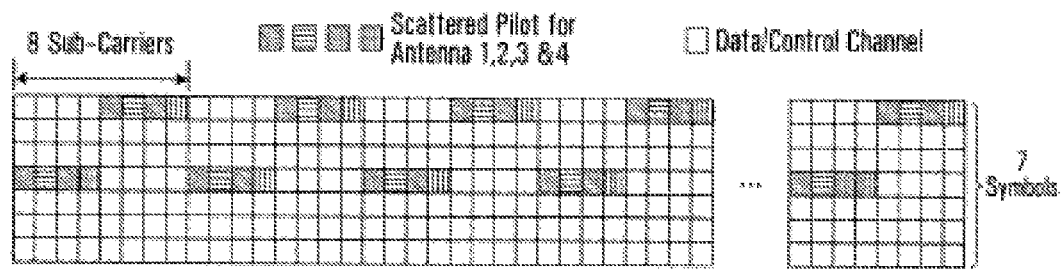
FIG. 5A is a diagram of a four antenna irregular diamond lattice scattered pilot pattern which can be used in accordance with an embodiment of the present invention.

FIG. 5A is a diagram of a four antenna irregular diamond lattice scattered pilot pattern which can be used in accordance with an embodiment of the present invention. The overhead associated with this scattered pilot pattern is 1/28 per antenna. In this embodiment, an OFDM frame comprises eight sub-carriers 528 and seven OFDM symbols 530.

Pilot and data symbols are spread over an OFDM frame in a time direction 420 and a frequency direction 522. Most symbols within the OFDM frame are data symbols 524. Pilot symbols 526 are inserted in an irregular diamond lattice pattern.

As with the scattered pilot pattern in FIG. 1, there is first performed a calculation of the channel changes in both the time direction and the frequency direction and a comparison is made as to which direction the channel changes faster. One-dimensional interpolation is then performed in the direction with slower channel change. Using these measurements, one-dimensional interpolation is then performed in the direction with faster channel change.

Figure 5B:
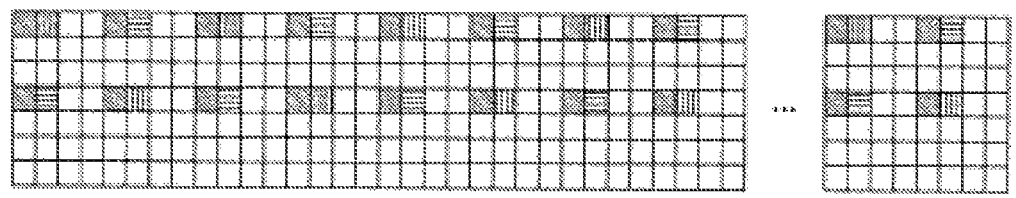
FIG. 5B is a diagram of a four antenna irregular diamond lattice scattered pilot pattern which can be used in accordance with an embodiment of the present invention.
Figure 5C:
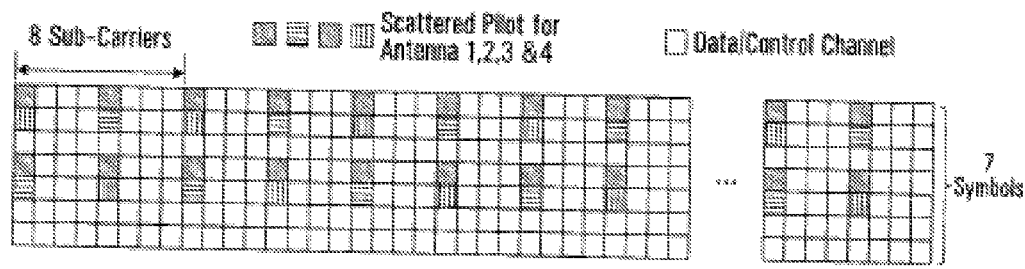
FIG. 5C is a diagram of a four antenna irregular diamond lattice scattered pilot pattern which can be used in accordance with an embodiment of the present invention.
Figure 5D:
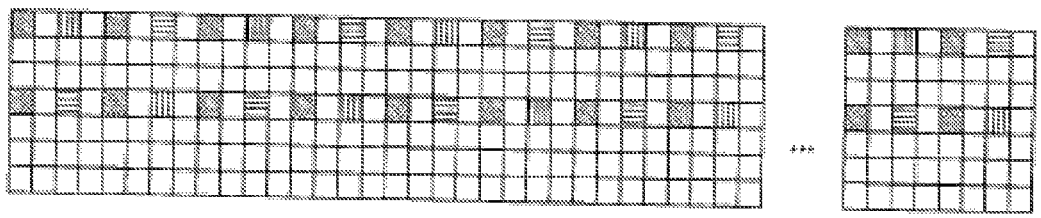
FIG. 5D is a diagram of a four antenna irregular diamond lattice scattered pilot pattern which can be used in accordance with an embodiment of the present invention.

FIGS. 5B, 5C and 5D are three other examples of scattered pilot patterns which can be generated according to this embodiment.

Figure 6:
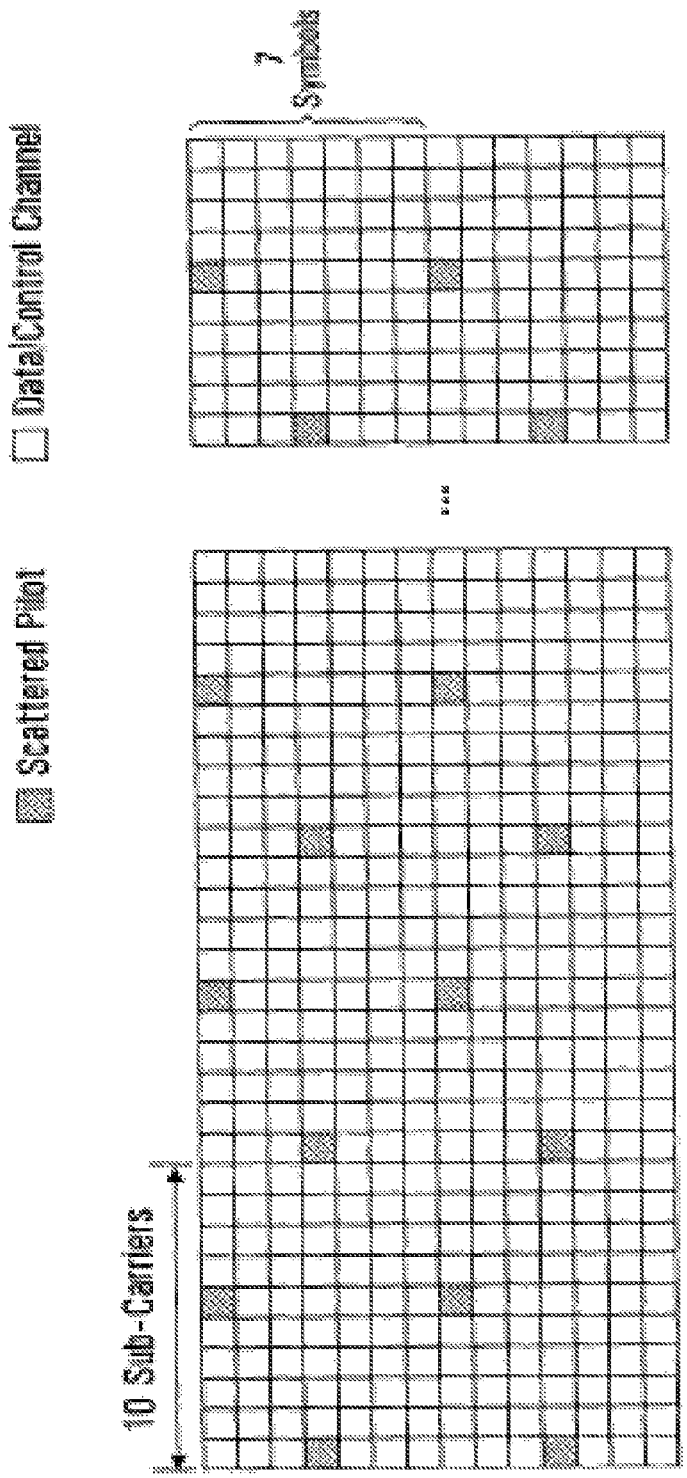
FIG. 6 is a diagram of a single antenna irregular diamond lattice scattered pilot pattern which can be used in accordance with an embodiment of the present invention.

FIG. 6 is a diagram of a single antenna irregular diamond lattice scattered pilot pattern which can be used in accordance with an embodiment of the present invention.

Figure 7A:
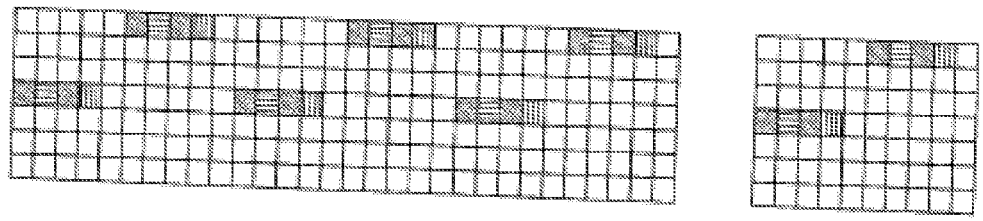
FIG. 7A is a diagram of a four antenna irregular diamond lattice scattered pilot pattern which can be used in accordance with an embodiment of the present invention.

FIG. 7A is a diagram of a four antenna irregular diamond lattice scattered pilot pattern which can be used in accordance with an embodiment of the present invention.

Figure 7B:
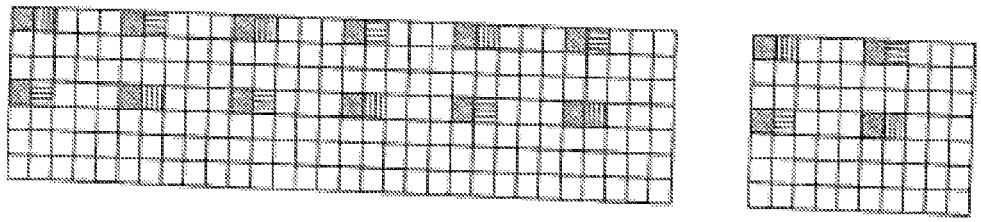
FIG. 7B is a diagram of a four antenna irregular diamond lattice scattered pilot pattern which can be used in accordance with an embodiment of the present invention.

FIG. 7B is a diagram of a four antenna irregular diamond lattice scattered pilot pattern which can be used in accordance with an embodiment of the present invention.

Figure 7C:
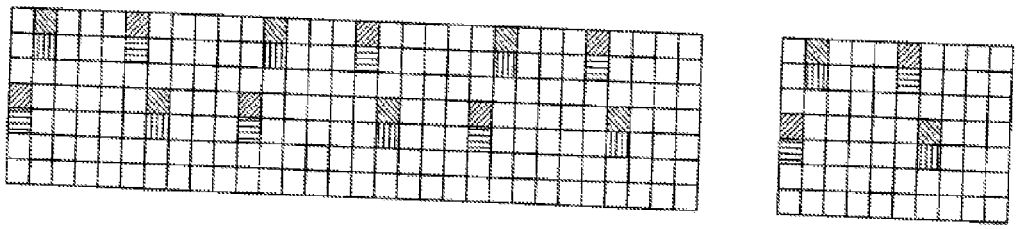
FIG. 7C is a diagram of a four antenna irregular diamond lattice scattered pilot pattern which can be used in accordance with an embodiment of the present invention.

FIG. 7C is a diagram of a four antenna irregular diamond lattice scattered pilot pattern which can be used in accordance with an embodiment of the present invention.

Figure 7D:
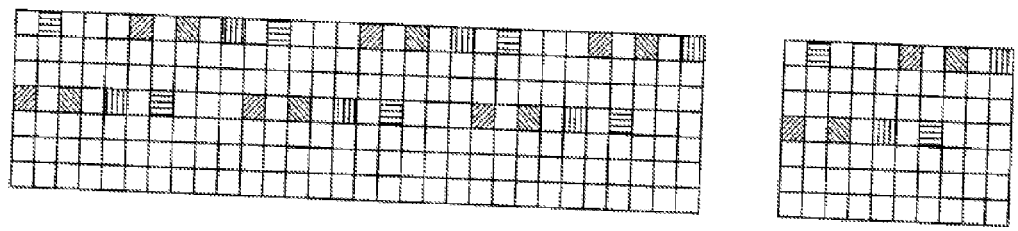
FIG. 7D is a diagram of a four antenna irregular diamond lattice scattered pilot pattern which can be used in accordance with an embodiment of the present invention.

FIG. 7D is a diagram of a four antenna irregular diamond lattice scattered pilot pattern which can be used in accordance with an embodiment of the present invention.

Figure 8:
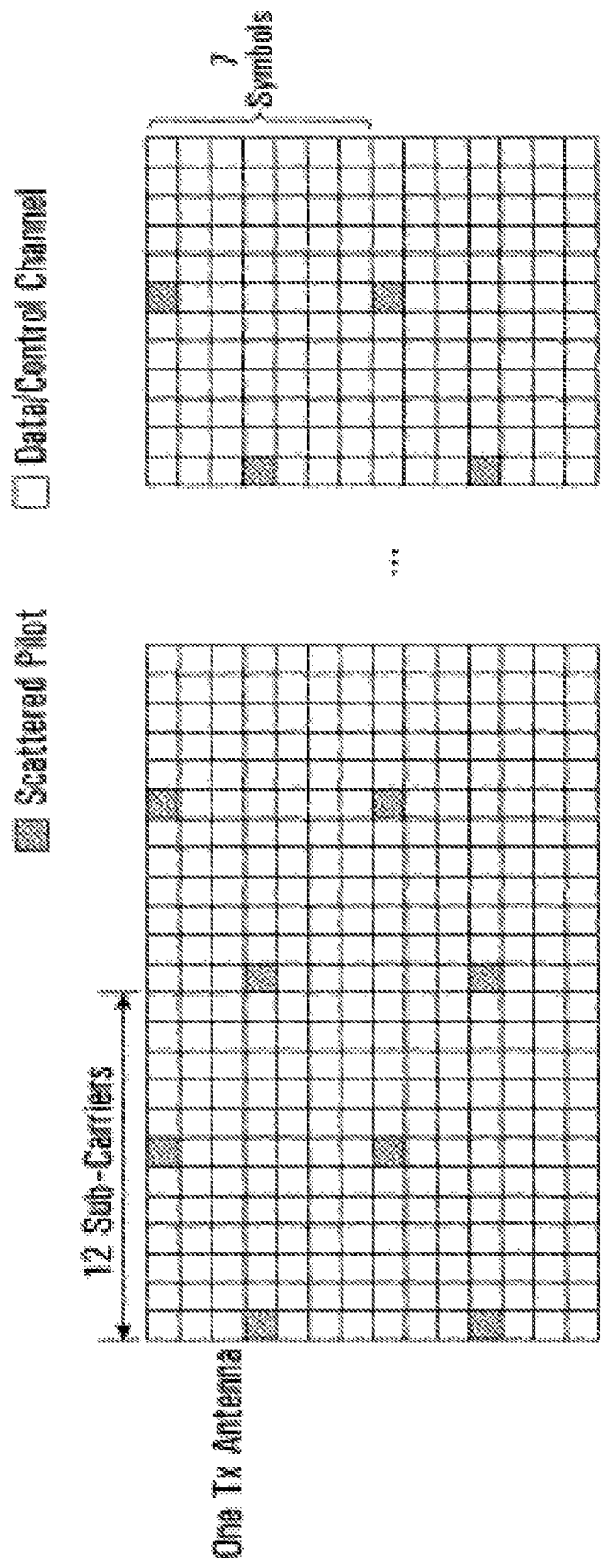
FIG. 8 is a diagram of a single antenna irregular diamond lattice scattered pilot pattern which can be used in accordance with an embodiment of the present invention.

FIG. 8 is a diagram of a single antenna irregular diamond lattice scattered pilot pattern which can be used in accordance with an embodiment of the present invention.

Figure 9A:
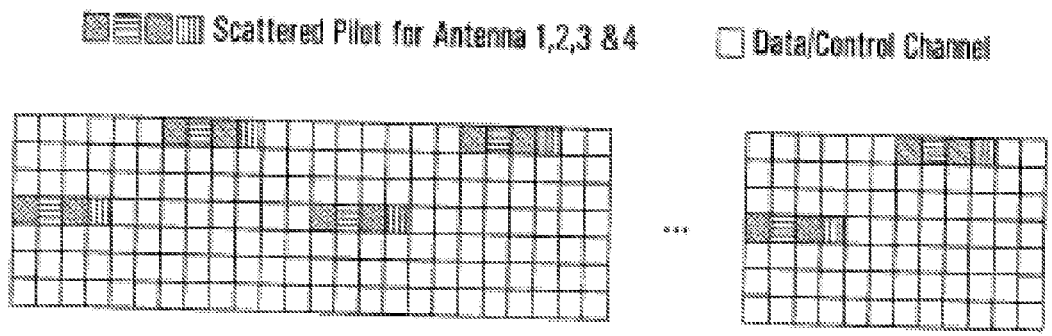
FIG. 9A is a diagram of a four antenna irregular diamond lattice scattered pilot pattern which can be used in accordance with an embodiment of the present invention.

FIG. 9A is a diagram of a four antenna irregular diamond lattice scattered pilot pattern which can be used in accordance with an embodiment of the present invention.

Figure 9B:
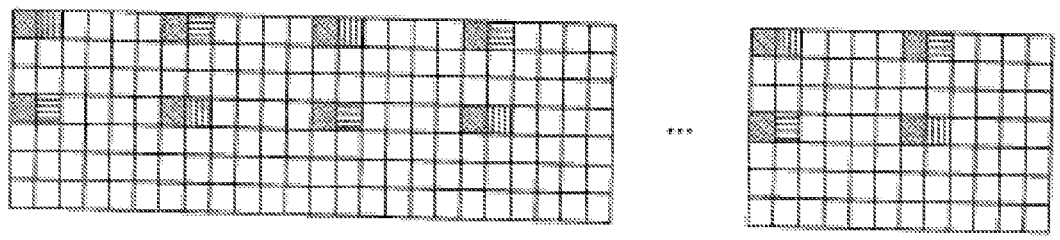
FIG. 9B is a diagram of a four antenna irregular diamond lattice scattered pilot pattern which can be used in accordance with an embodiment of the present invention.

FIG. 9B is a diagram of a four antenna irregular diamond lattice scattered pilot pattern which can be used in accordance with an embodiment of the present invention.

Figure 9C:
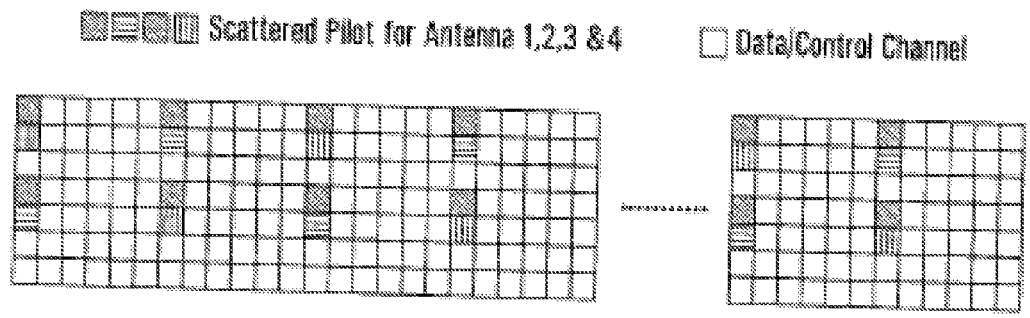
FIG. 9C is a diagram of a four antenna irregular diamond lattice scattered pilot pattern which can be used in accordance with an embodiment of the present invention.

FIG. 9C is a diagram of a four antenna irregular diamond lattice scattered pilot pattern which can be used in accordance with an embodiment of the present invention.

Figure 9D:
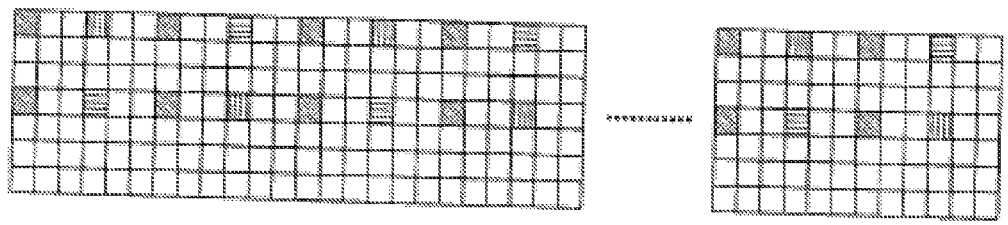
FIG. 9D is a diagram of a four antenna irregular diamond lattice scattered pilot pattern which can be used in accordance with an embodiment of the present invention.

FIG. 9D is a diagram of a four antenna irregular diamond lattice scattered pilot pattern which can be used in accordance with an embodiment of the present invention.

Figure 10A:
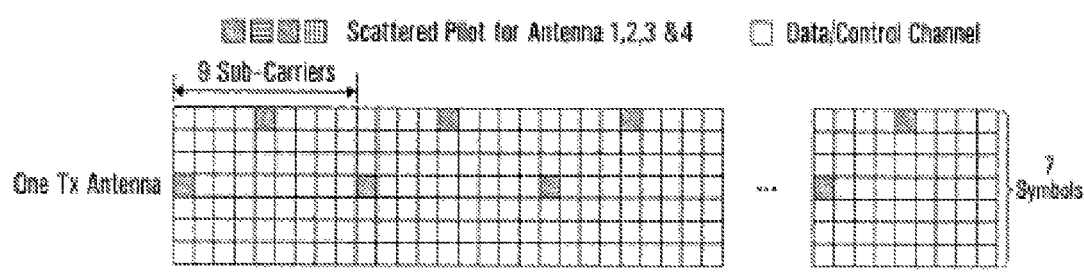
FIG. 10A is a diagram of a one antenna irregular diamond lattice scattered pilot pattern which can be used in accordance with an embodiment of the present invention.

FIG. 10A is a diagram of a one antenna irregular diamond lattice scattered pilot pattern which can be used in accordance with an embodiment of the present invention.

Figure 10B:
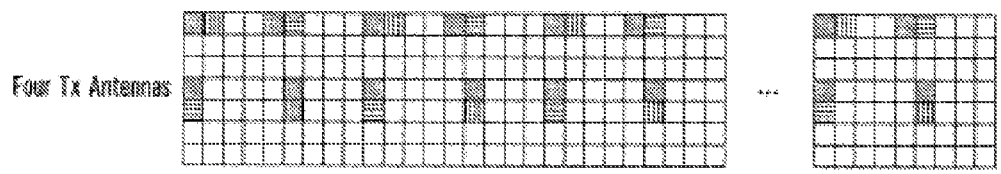
FIG. 10B is a diagram of a four antenna irregular diamond lattice scattered pilot pattern which can be used in accordance with an embodiment of the present invention.

FIG. 10B is a diagram of a four antenna irregular diamond lattice scattered pilot pattern which can be used in accordance with an embodiment of the present invention.

Figure 11A:
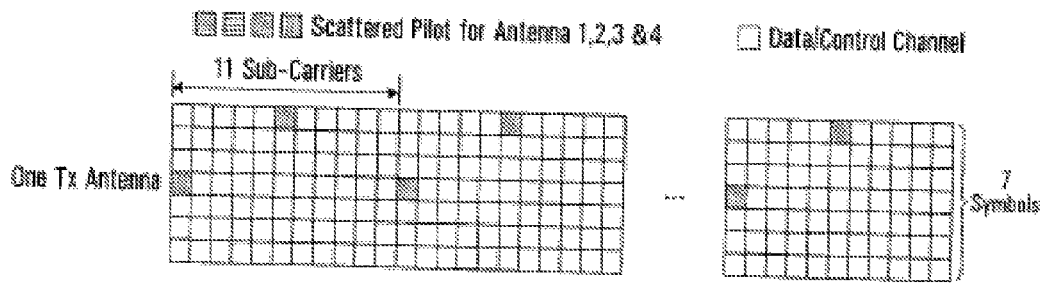
FIG. 11A is a diagram of a one antenna irregular diamond lattice scattered pilot pattern which can be used in accordance with an embodiment of the present invention.

FIG. 11A is a diagram of a one antenna irregular diamond lattice scattered pilot pattern which can be used in accordance with an embodiment of the present invention.

Figure 11B:
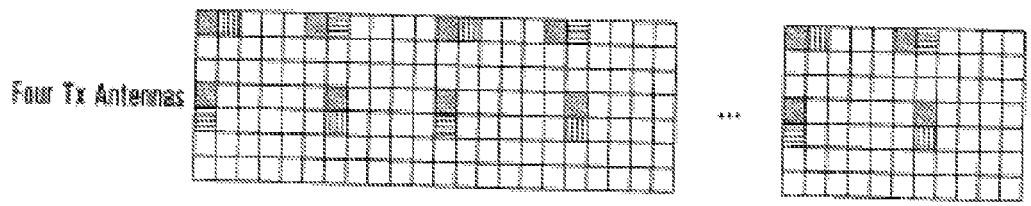
FIG. 11B is a diagram of a four antenna irregular diamond lattice scattered pilot pattern which can be used in accordance with an embodiment of the present invention.

FIG. 11B is a diagram of a four antenna irregular diamond lattice scattered pilot pattern which can be used in accordance with an embodiment of the present invention.

Figure 12A:
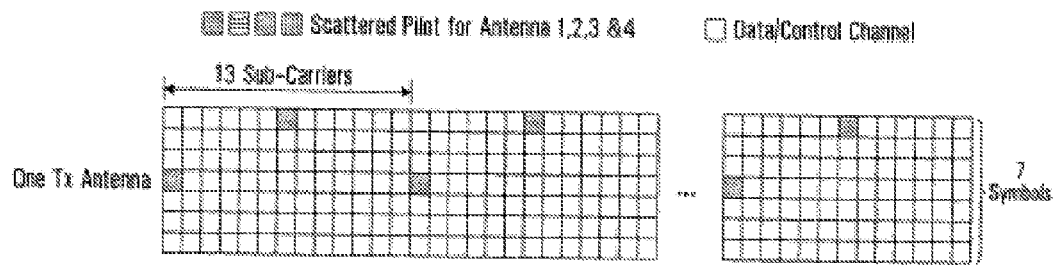
FIG. 12A is a diagram of a one antenna irregular diamond lattice scattered pilot pattern which can be used in accordance with an embodiment of the present invention.

FIG. 12A is a diagram of a one antenna irregular diamond lattice scattered pilot pattern which can be used in accordance with an embodiment of the present invention.

Figure 12B:
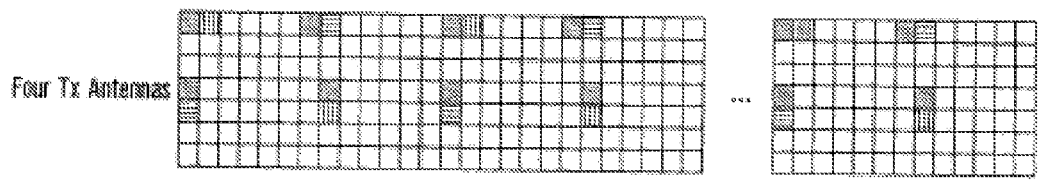
FIG. 12B is a diagram of a four antenna irregular diamond lattice scattered pilot pattern which can be used in accordance with an embodiment of the present invention.

FIG. 12B is a diagram of a four antenna irregular diamond lattice scattered pilot pattern which can be used in accordance with an embodiment of the present invention.

For the purposes of providing context for embodiments of the invention for use in a communication system, FIGS. 13-17 will now be described. As will be described in more detail below, the method of the present invention can, in one embodiment, be implemented through means of the channel estimation logic of a conventional OFDM receiver (see channel estimation 96 in FIG. 17).

Figure 13:
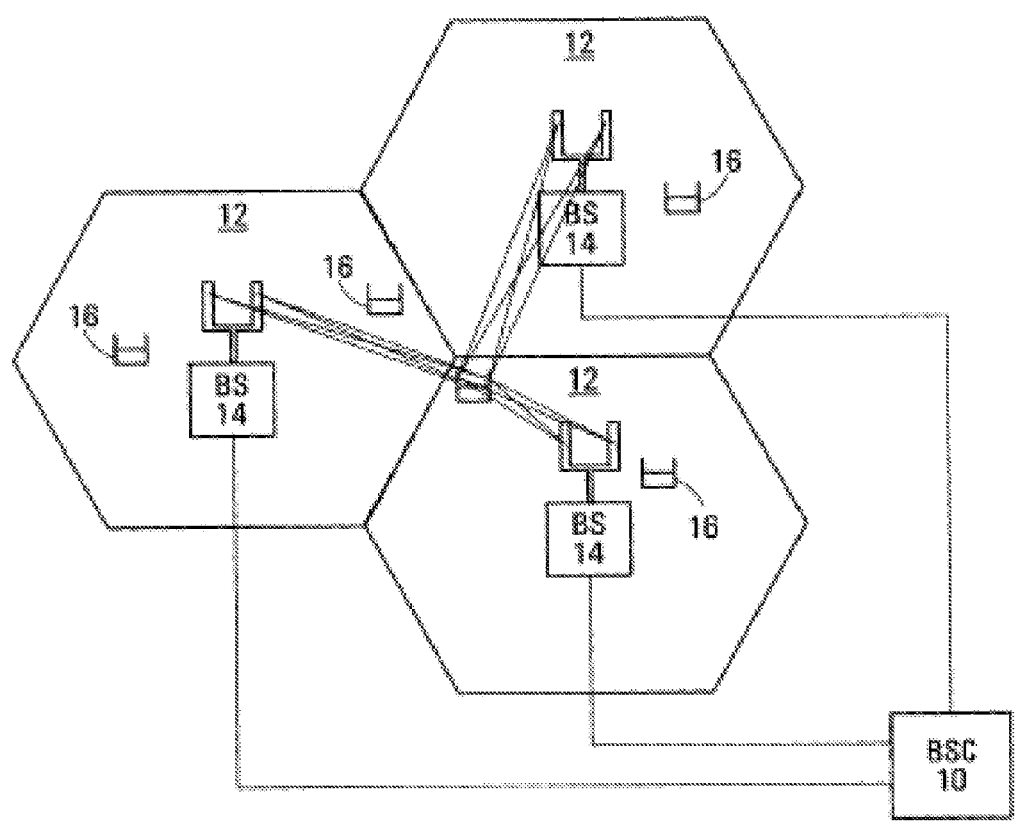
FIG. 13 is a block diagram of a cellular communication system.

FIG. 13 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 14:
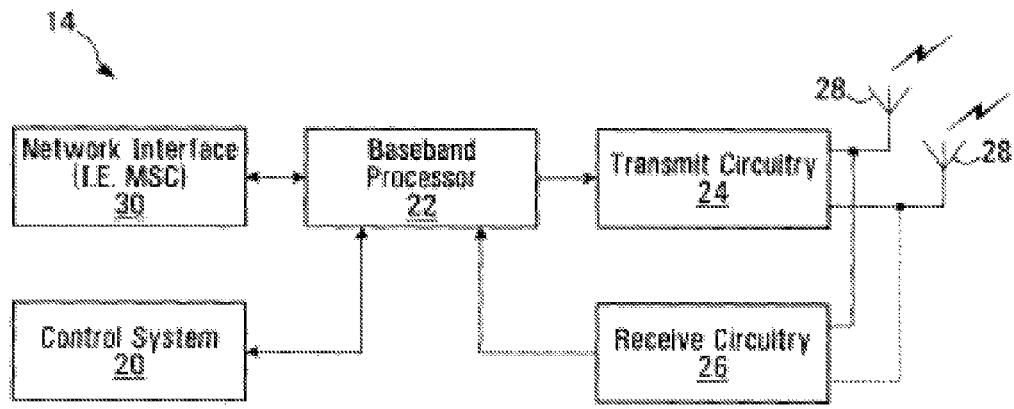
FIG. 14 is a block diagram of an example base station that might be used to implement some embodiments of the present invention.

A high level overview of the mobile terminals 16 and base stations 14 upon which aspects of the present invention may be implemented is provided prior to delving into the structural and functional details of the preferred embodiments. With reference to FIG. 14, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 13). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 15:
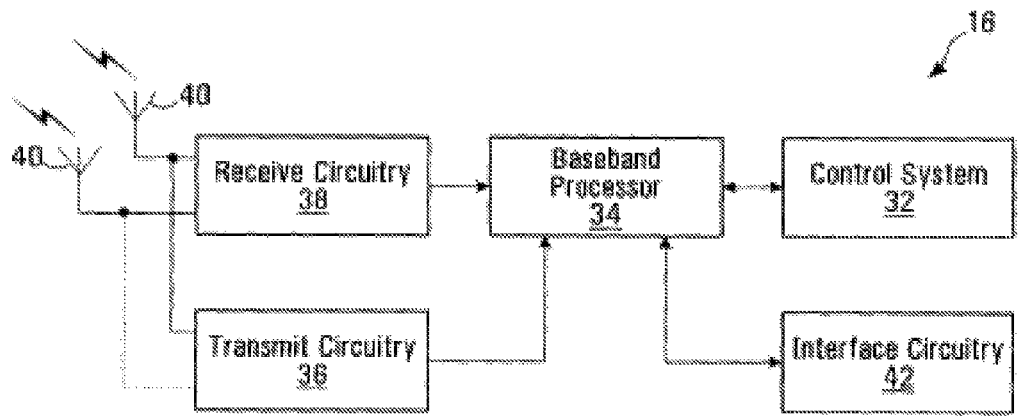
FIG. 15 is a block diagram of an example wireless terminal that might be used to implement some embodiments of the present invention.

With reference to FIG. 15, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 16:
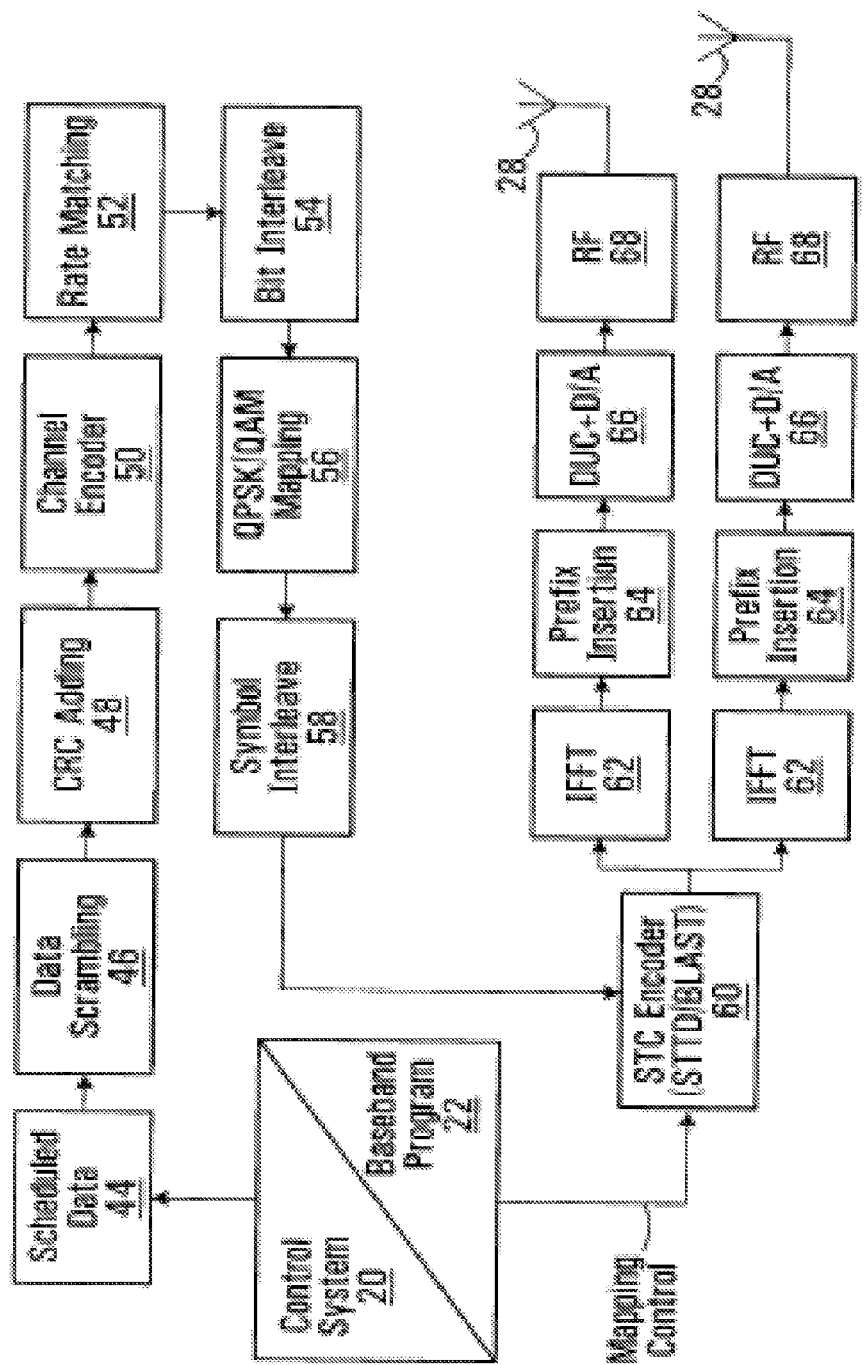
FIG. 16 is a block diagram of a logical breakdown of an example OFDM transmitter architecture that might be used to implement some embodiments of the present invention.

With reference to FIG. 16, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 14 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 17:
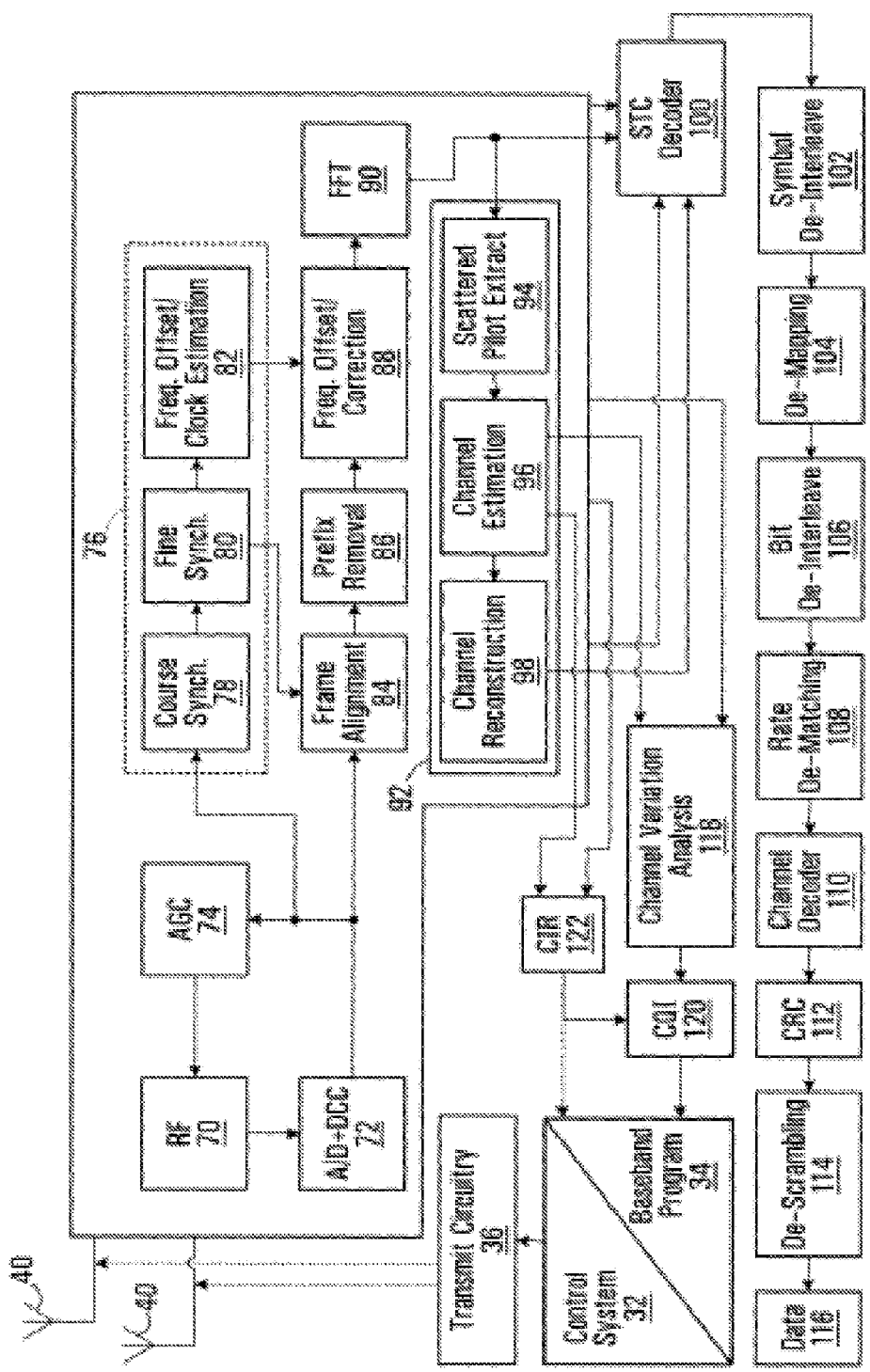
FIG. 17 is a block diagram of a logical breakdown of an example OFDM receiver architecture that might be used to implement some embodiments of the present invention.

Reference is now made to FIG. 17 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 17, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 18:
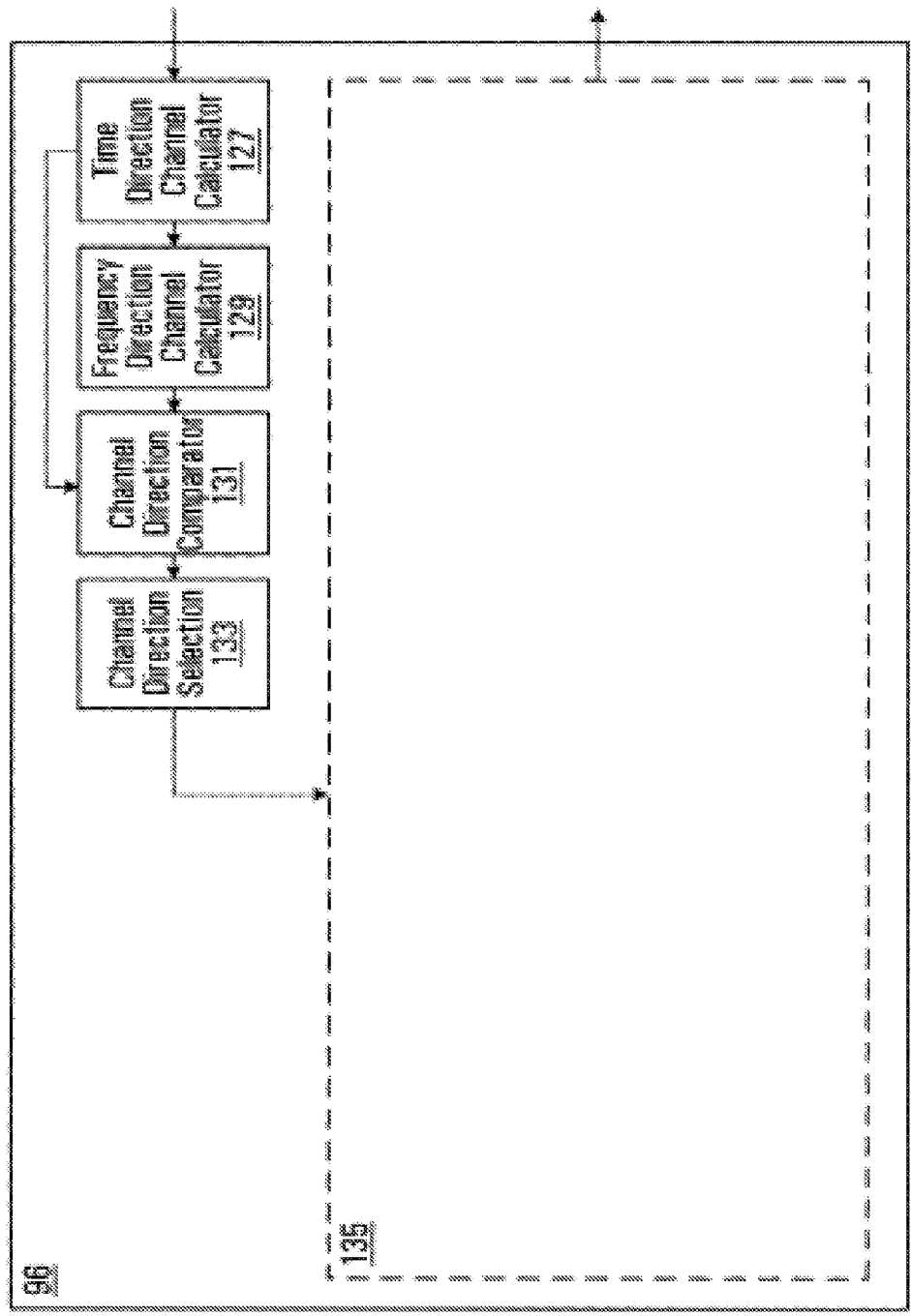
FIG. 18 is a block diagram of one embodiment of the present invention.

FIG. 18 is a block diagram of one embodiment of the present invention. In this embodiment, the present invention is shown being implemented within channel estimation logic 96 of FIG. 17 with the conventional aspects of channel estimation logic 96 being shown in dotted outline for ease of reference. Persons skilled in the art will appreciate that the present invention could be implemented as a separate logical component as well.

Shown is time direction channel calculator 127 which performs the calculation of channel change in the time direction. Frequency direction channel calculator 129 performs the calculation of channel change in the frequency direction. As explained above, the preferred calculation is the inner product of the two pilot assisted channel estimates being compared. Though time direction channel calculator 127 is shown as being illustrated to the right of frequency direction channel calculator 129, this does not mean that the time direction channel calculation is necessarily to be performed first or that the calculations cannot be performed simultaneously. Either calculation can be performed first, or both can be performed simultaneously. Channel direction comparator 131 compares the results of the calculations performed by both direction channel calculator 127 and frequency direction channel calculator 129 for the purpose of comparing and ascertaining which channel direction, time or frequency, changes slower. Channel direction selector 133 selects which of the two directions changes slower. Block 135 is utilized to interpolate, first in the direction of slower change, and then in the direction of faster change, in accordance with conventional means.

In operation, time direction channel calculator 127 receives two pilot assisted channel estimates and performs the calculation of channel change in the time direction. Frequency direction channel calculator 129 performs the calculation of channel change in the frequency direction though these two calculations can be performed in different order or simultaneously. Channel direction comparator 131 compares the results of the calculations performed by both direction channel calculator 127 and frequency direction channel calculator 129 and compares which channel direction, time or frequency, changes slower. Channel direction selector 133 selects the direction of slower change and interpolation is then performed by block 135 in that direction first, and then in the direction of faster change in accordance with conventional means.

FIGS. 13 to 18 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practiced otherwise than as specifically described herein.

What is claimed is:
1. An apparatus comprising:
a processor, wherein the processor is configured to receive transmissions via one or more receive antennas, wherein the processor is configured to:
receive, via the one or more receive antennas, a signal comprising a plurality of collections of pilot symbols transmitted by a plurality of transmit antennas, respectively, wherein the plurality of collections of pilot symbols are received respectively from a plurality of sets of resource locations of a plurality of consecutive subframes;
wherein each subframe of the plurality of consecutive subframes spans a plurality of OFDM symbol durations in time and a plurality of subcarriers in frequency;
wherein each set of resource locations, corresponding to a respective transmit antenna of the plurality of transmit antennas, is scattered in each subframe,
wherein the respective sets of resource locations of the respective transmit antennas are identical but staggered in the frequency domain;
wherein the sets of resource locations belonging to the plurality of sets of resource locations are disjoint,
wherein each resource location of each set of resource locations belonging to the plurality of sets of resource locations of the plurality of consecutive subframes is frequency and time non-adjacent to any other resource location belonging to the plurality of sets of resource locations of the plurality of consecutive subframes,
wherein, for each transmit antenna of the plurality of transmit antennas, the corresponding set of resource locations includes:
a plurality of first resource locations that are on a first subcarrier in every seventh OFDM symbol duration of the plurality of consecutive subframes;
a plurality of second resource locations that are on a second subcarrier in every seventh OFDM symbol duration of the plurality of consecutive subframes, wherein the plurality of first resource locations and the plurality of second resource locations are in the same OFDM symbol durations in time and are on non-adjacent subcarriers in frequency;
a plurality of third resource locations that are on a third subcarrier in every seventh OFDM symbol duration of the plurality of consecutive subframes, wherein the third subcarrier is different and non-adjacent to the first subcarrier and the second subcarrier, wherein the plurality of third resource locations are on different and non-adjacent OFDM symbol durations than the plurality of first resource locations and the plurality of second resource locations, wherein the third subcarrier is located in between the first and second subcarriers in frequency and is an equal number of subcarriers from the first subcarrier and the second subcarrier; and
wherein at least one of the plurality of first resource locations is on a first OFDM symbol duration at the beginning of each subframe of the plurality of consecutive subframes.

2. The apparatus of claim 1, wherein, for each of the transmit antennas, the plurality of third resource locations of the respective set is offset by four OFDM symbols durations from the plurality of first resource locations of the respective set.

3. The apparatus of claim 2, wherein the apparatus is a mobile terminal and the signal is a downlink signal received from a base station.

4. The apparatus of claim 3, wherein, in each subframe of said plurality of consecutive subframe, at least two OFDM symbol durations in the subframe include resource locations belonging to each of the plurality of sets of resource locations, and wherein none of the OFDM symbol durations that include resource locations of the plurality of sets of resource locations are consecutive in time.

5. The apparatus of claim 4, wherein, for each of the transmit antennas, the corresponding set of resource locations includes:
a plurality of fourth resource locations are on a fourth subcarrier in every seventh OFDM duration of the plurality of consecutive subframes, wherein the plurality of first resource locations and the plurality of fourth resource locations occupy the same OFDM durations and are separated by eleven intervening subcarriers.

6. The apparatus of claim 5, wherein the pilot symbols are common pilots.

7. The apparatus of claim 6, wherein the signal further comprises dedicated pilots arranged in a dedicated pilot pattern in a portion of at least one subframe of the plurality of consecutive subframes.

8. A user equipment (UE) comprising:
one or more receive antennas; and
a processor, wherein the processor is configured to receive transmissions via the one or more receive antennas, wherein the processor is configured to:
receive, via the one or more receive antennas, a signal comprising a plurality of collections of pilot symbols transmitted by a plurality of transmit antennas, respectively, wherein the plurality of collections of pilot symbols are received respectively from a plurality of sets of resource locations of a plurality of consecutive subframes;
wherein each subframe of the plurality of consecutive subframes spans a plurality of OFDM symbol durations in time and a plurality of subcarriers in frequency;
wherein each set of resource locations, corresponding to a respective transmit antenna of the plurality of transmit antennas, is scattered in each subframe,
wherein the respective sets of resource locations of the respective transmit antennas are identical but staggered in the frequency domain;
wherein the sets of resource locations belonging to the plurality of sets of resource locations are disjoint,
wherein each resource location of each set of resource locations belonging to the plurality of sets of resource locations of the plurality of consecutive subframes is frequency and time non-adjacent to any other resource location belonging to the plurality of sets of resource locations of the plurality of consecutive subframes,
wherein, for each transmit antenna of the plurality of transmit antennas, the corresponding set of resource locations includes:
a plurality of first resource locations that are on a first subcarrier in every seventh OFDM symbol duration of the plurality of consecutive subframes;
a plurality of second resource locations that are on a second subcarrier in every seventh OFDM symbol duration of the plurality of consecutive subframes, wherein the plurality of first resource locations and the plurality of second resource locations are in the same OFDM symbol durations in time and are on non-adjacent subcarriers in frequency;
a plurality of third resource locations that are on a third subcarrier in every seventh OFDM symbol duration of the plurality of consecutive subframes, wherein the third subcarrier is different and non-adjacent to the first subcarrier and the second subcarrier, wherein the plurality of third resource locations are on different and non-adjacent OFDM symbol durations than the plurality of first resource locations and the plurality of second resource locations, wherein the third subcarrier is located in between the first and second subcarriers in frequency and is an equal number of subcarriers from the first subcarrier and the second subcarrier; and
wherein at least one of the plurality of first resource locations is on a first OFDM symbol duration at the beginning of each subframe of the plurality of consecutive subframes.

9. The user equipment of claim 8, wherein, for each of the transmit antennas, the plurality of third resource locations of the respective set is offset by four OFDM symbols durations from the plurality of first resource locations of the respective set.

10. The user equipment of claim 9, wherein, in each subframe of said plurality of consecutive subframe, at least two OFDM symbol durations in the subframe include resource locations belonging to each of the plurality of sets of resource locations, and wherein none of the OFDM symbol durations that include resource locations of the plurality of sets of resource locations are consecutive in time.

11. The user equipment of claim 10, wherein, for each of the transmit antennas, the corresponding set of resource locations includes:
a plurality of fourth resource locations are on a fourth subcarrier in every seventh OFDM duration of the plurality of consecutive subframes, wherein the plurality of first resource locations and the plurality of fourth resource locations occupy the same OFDM durations and are separated by eleven intervening subcarriers.

12. The user equipment of claim 11, wherein the pilot symbols are common pilots.

13. The user equipment of claim 12, wherein the signal further comprises dedicated pilots arranged in a dedicated pilot pattern in a portion of at least one subframe of the plurality of consecutive subframes.

14. A method comprising:
receiving, via one or more receive antennas, a signal comprising a plurality of collections of pilot symbols transmitted by a plurality of transmit antennas, respectively, wherein the plurality of collections of pilot symbols are received respectively from a plurality of sets of resource locations of a plurality of consecutive subframes;
wherein each subframe of the plurality of consecutive subframes spans a plurality of OFDM symbol durations in time and a plurality of subcarriers in frequency;
wherein each set of resource locations, corresponding to a respective transmit antenna of the plurality of transmit antennas, is scattered in each subframe,
wherein the respective sets of resource locations of the respective transmit antennas are identical but staggered in the frequency domain;
wherein the sets of resource locations belonging to the plurality of sets of resource locations are disjoint,
wherein each resource location of each set of resource locations belonging to the plurality of sets of resource locations of the plurality of consecutive subframes is frequency and time non-adjacent to any other resource location belonging to the plurality of sets of resource locations of the plurality of consecutive subframes, wherein, for each transmit antenna of the plurality of transmit antennas, the corresponding set of resource locations includes:
- a plurality of first resource locations that are on a first subcarrier in every seventh OFDM symbol duration of the plurality of consecutive subframes;
- a plurality of second resource locations that are on a second subcarrier in every seventh OFDM symbol duration of the plurality of consecutive subframes, wherein the plurality of first resource locations and the plurality of second resource locations are in the same OFDM symbol durations in time and are on non-adjacent subcarriers in frequency;
- a plurality of third resource locations that are on a third subcarrier in every seventh OFDM symbol duration of the plurality of consecutive subframes, wherein the third subcarrier is different and non-adjacent to the first subcarrier and the second subcarrier, wherein the plurality of third resource locations are on different and non-adjacent OFDM symbol durations than the plurality of first resource locations and the plurality of second resource locations, wherein the third subcarrier is located in between the first and second subcarriers in frequency and is an equal number of subcarriers from the first subcarrier and the second subcarrier; and
- wherein at least one of the plurality of first resource locations is on a first OFDM symbol duration at the beginning of each subframe of the plurality of consecutive subframes.

15. The method of claim 14, wherein, for each of the transmit antennas, the plurality of third resource locations of the respective set is offset by four OFDM symbols durations from the plurality of first resource locations of the respective set.

16. The method of claim 15, wherein said receiving the signal is performed by a mobile terminal and the signal is a downlink signal received from a base station.

17. The method of claim 16, wherein, in each subframe of said plurality of consecutive subframe, at least two OFDM symbol durations in the subframe include resource locations belonging to each of the plurality of sets of resource locations, and wherein none of the OFDM symbol durations that include resource locations of the plurality of sets of resource locations are consecutive in time.

18. The method of claim 17, wherein, for each of the transmit antennas, the corresponding set of resource locations includes:
- a plurality of fourth resource locations are on a fourth subcarrier in every seventh OFDM duration of the plurality of consecutive subframes, wherein the plurality of first resource locations and the plurality of fourth resource locations occupy the same OFDM durations and are separated by eleven intervening subcarriers.

19. The method of claim 18, wherein the pilot symbols are common pilots.

20. The method of claim 19, wherein the signal further comprises dedicated pilots arranged in a dedicated pilot pattern in a portion of at least one subframe of the plurality of consecutive subframes.

* * * * *